MULTIPLE-PAIR DIGITAL DATA TRANSMISSION CABLE

Filed March 25, 1968

INVENTOR:
Frank W. Motley
By John B. Miller, Jr.
ATTORNEY

United States Patent Office 3,489,844
Patented Jan. 13, 1970

3,489,844

MULTIPLE-PAIR DIGITAL DATA TRANSMISSION CABLE

Frank W. Motley, Alhambra, Calif., assignor to Dynatronic Cable Engineering Corporation, Los Angeles, Calif., a corporation of California Filed Mar. 25, 1968, Ser. No. 715,814
Int. Cl. H01b *11/06;* H05k *9/00*
U.S. Cl. 174—32 10 Claims

ABSTRACT OF THE DISCLOSURE

This invention relates to a flexible digital data transmission cable comprising a plurality of identical twisted pairs of conductors, the surge impedance of all pairs of conductors being held to a predetermined equal value by twisting the inner pairs of conductors so as to have a greater number of twists per unit length than the number of twists per unit length of all outer pairs of conductors, and by applying a thin conducting surface over the cabled bundle of pairs of conductors to establish a fixed electrostatic field boundary.

BACKGROUND OF THE INVENTION

The present invention relates to flexible digital data transmission cables, and, more particularly, to a digital data transmission cable in which the surge impedance of all pairs of conductors therein is held to a predetermined equal value.

In the rapidly advancing art of computer technology, at least two generations of computers have existed. From vacuum tube computers through transistor-circuit board type computers the computer art is now entering into the third generation of computers in which discreet components are in the minority and most components are but small parts of integrated circuits. Such integrated circuit type computers are characterized by operation at very high speeds and extremely low power levels.

In the past, little if any consideration has been given to the means of connecting digital computing devices and their peripheral equipment comprising data processing units, storage units, and input-output equipment. Primarily, this has been so because satisfactory coupling of such units could always be had by using commonly available wires and cables. However, with the advent of high speed, low powered integrated computing elements, a number of serious problems have been recognized by designers of interface equipment for which solutions are not readily available in the wire and cable art.

Inherent in the high speed, low power integrated circuit elements are factors which limit their performance when used as driving and receiving circuits for interequipment transmission lines. More particularly, the typical logic circuits must provide certain preferred voltage levels at the load end of the transmission line, these preferred voltage levels corresponding to a binary "1" or "0." When a voltage step, whose rise time is short compared to the transit time of the step along the transmission line to its end, is applied to one end of a transmission line, the current which flows in that transmission line initially is not dependent upon the means used to terminate the transmission line, and is limited primarily by the impedance of the generator used to drive the transmission line and the transmission line's surge impedance connected in series. That is, initially the current flowing in the transmission line is equal to the output voltage of the line generator divided by the sum of the output impedance of the generator plus the line surge impedance. However, the low power-handling capability of these integrated micro-circuits makes the use of a high surge impedance transmission line highly preferable because less current is required from the driving circuit to charge or discharge the line capacitance to the preferred voltage levels than would be required if the line were of low impedance, such as fifty ohms. The lower currents required of the driving circuit thus cause less $I^2R$ heating within the driving circuit, thereby allowing it to operate with greater reliability.

It would seem possible that various types of transmission lines presently existing in the art could be used to interconnect such integrated circuit type computers, such transmission lines individually having the desired high surge impedance. A problem arises, however, in effecting this desired result when such individually acceptable transmission lines are cabled together or when such transmission lines, individually, come in contact or in close proximity with a conducting surface such as the earth, the floor of a building, or metal surfaces coupled thereto. More particularly, the common means of transmitting digital data from one unit of a computer to another is a pair of conductors. Commonly, such conductors are twisted together or formed into a coaxial type cable. Because there are many circuits of one computer unit which must be coupled to corresponding other circuits in a second computer unit, many such twisted pairs are cabled together to form a data transmission cable comprising a plurality of pairs of conductors. Typically, all conductors within such a cable are the same size and each conductor is provided with the same thickness of a suitable dielectric insulating material. Experimentation with such prior art data transmission cables has shown that the surge impedance measured across wires of a pair in the outer layer is appreciably higher than the surge impedance measured across a pair toward the center of the cable. Additionally, the surge impedance of wire pairs in the outer layer is reduced at any spot along the length of the cable where the cable comes in contact or in close proximity to a conducting surface such as mentioned above.

The effect of these impedance changes, which are dependent upon the length of an unshielded cable bundle from conductive surfaces, is extremely detrimental to the intended operation of the data transmission line, since at any point of discontinuity of surge impedance along the length of a particular pair of conductors there is a partial reflection of the pulse which has been applied to the driven end of the cable. The reflected pulse propagates back toward the driving circuit and, if not absorbed in the impedance of the driving circuit, is then reflected again toward the load as a spurious signal from the generator. Since the high speed load circuitry can respond to pulse lengths on the order of two to three nanoseconds, an impedance discontinuity due to only a few feet of cable being subjected to the impedance upset caused by its proximity to a conducting surface may cause sufficient spurious voltage steps so as to seriously interfere with the proper operation of the computer/cable system. The magnitude of interference caused by these spurious pulse signals which occur at impedance discontinuities may be amplified. In this regard, the driving circuit impedance may be of several different values depending upon whether the driving circuit is in one or the other of its two logic states or whether it is at a point of transition between these two states. When the driving circuit impedance is above or below the surge impedance of the particular pair of conductors which it is driving, the reflected pulse may be of the same polarity upon re-reflection at the generator, or the reflected pulse may be inverted depending upon the relative internal impedance of the generator at the time of re-reflection. Thus, the re-reflected spurious signal may add algebraically with the original signal causing undesired operation of the logic circuits at the load end of the transmission line. Second order effects, such as additional signal cross talk between adjacent pairs of conductors due to these spurious pulses, may also occur.

As will be described in greater detail hereinafter, the surge impedance measured across a particular pair of conductors is primarily controlled by the capacitance between the two conductors of that pair, the capacitance between each wire of that pair and all other wires in the cable, and the capacitance from each conductor of the pair to the conducting surface near which the cable has been placed or in which it has come in contact. The near proximity of such a conducting surface substantially increases the amount of capacitance measurable between each of the conductors of the pair and that conducting surface. The capacitance increases cause concomitant surge impedance changes. As may be seen from the foregoing discussion, some means of avoiding the introduction of surge impedance changes between paired conductors in a digital data transmission cable is highly necessary when such cables are used to interconnect high speed, low power integrated computing circuits.

It is, therefore, an object of the present invention to provide a flexible multi-conductor electrical cable for efficiently interconnecting high speed, low power computing circuits.

It is another object of the present invention to provide comes in contact or in close proximity to a conductors, the surge impedance of each of which is held to a predetermined constant value.

It is still another object of the present invention to prevent changes in the surge impedance of pairs of conductors within a data transmission cable when such cable comes in contact or in close proximity to a conducting surface.

A further object of the present invention is to prevent failures of integrated circuits due to excessive power dissipation in such circuits when they are intercoupled by means of transmission cable.

Still another object of the present invention is to maintain the surge impedance of all pairs of conductors within a transmission cable at a desired value regardless of the disturbing effects of cable dress or the proximity of such a cable to conducting surfaces.

These and other objects and advantages are accomplished in accordance with features of the present invention by a multiple-pair digital data transmission cable comprising a plurality of individually twisted pairs of wires. Hereinafter, the term "wire" will be used to refer to a conductor (either stranded or solid) around which is extruded or wrapped an insulating material. The term "conductor" will refer only to the conductive element of a wire. Also, the term "pair" will refer to two wires twisted together to form a two-wire transmission line. Having these definitions in mind, a cable constructed in accordance with teachings of the present invention comprises a plurality of wire pairs cabled together in concentric layers about a central core. The pairs of wires are individually twisted so that the pairs on an inner layer have a greater number of twists per unit length than do the pairs positioned in an outer layer. As will be described in greater detail hereinafter, such variations in the twist length of the pairs in the cable tends to make the surge impedance of the inner pairs substantially equal to the surge impedance of the pairs in the outer layers.

The desired lay lengths of all pairs are held, and wires of all pairs are prevented from moving apart, so as not to change their planned spacing and, thus, their mutual capacitance and self inductance, which in turn control their surge impedance. This is accomplished by a thin layer of insulating material, wrapped or extruded around each of the pairs in a manner well known to those skilled in the art. A thin conducting surface is applied over the cable bundle of pairs for the purpose of establishing a fixed electrostatic field boundary to eliminate the above-mentioned deleterious effects when the cable is placed in close proximity to a conducting surface. Accordingly, by controlling the lay lengths of the individual pairs within the cable and by applying a thin conducting surface over the entire cable bundle, the surge impedance of all pairs of conductors within the cable is held to a predetermined equal value regardless of the proximity of the cable to a conducting surface and without adversely affecting the flexibility of the cable.

The novel features which are believed to be characteristic of the present invention, both as to its organization and method of operation, together with further objects and advantages thereof, will be better understood from the following description considered in connection with the accompanying drawings in which one embodiment of the present invention is illustrated by way of example. It is to be expressly understood, however, that the drawings are for the purposes of illustration and description only and are not intended as a definition of the limits of the invention.

DESCRIPTION OF THE PREFERRED EMBODIMENT

Figures 1, 2, 3:
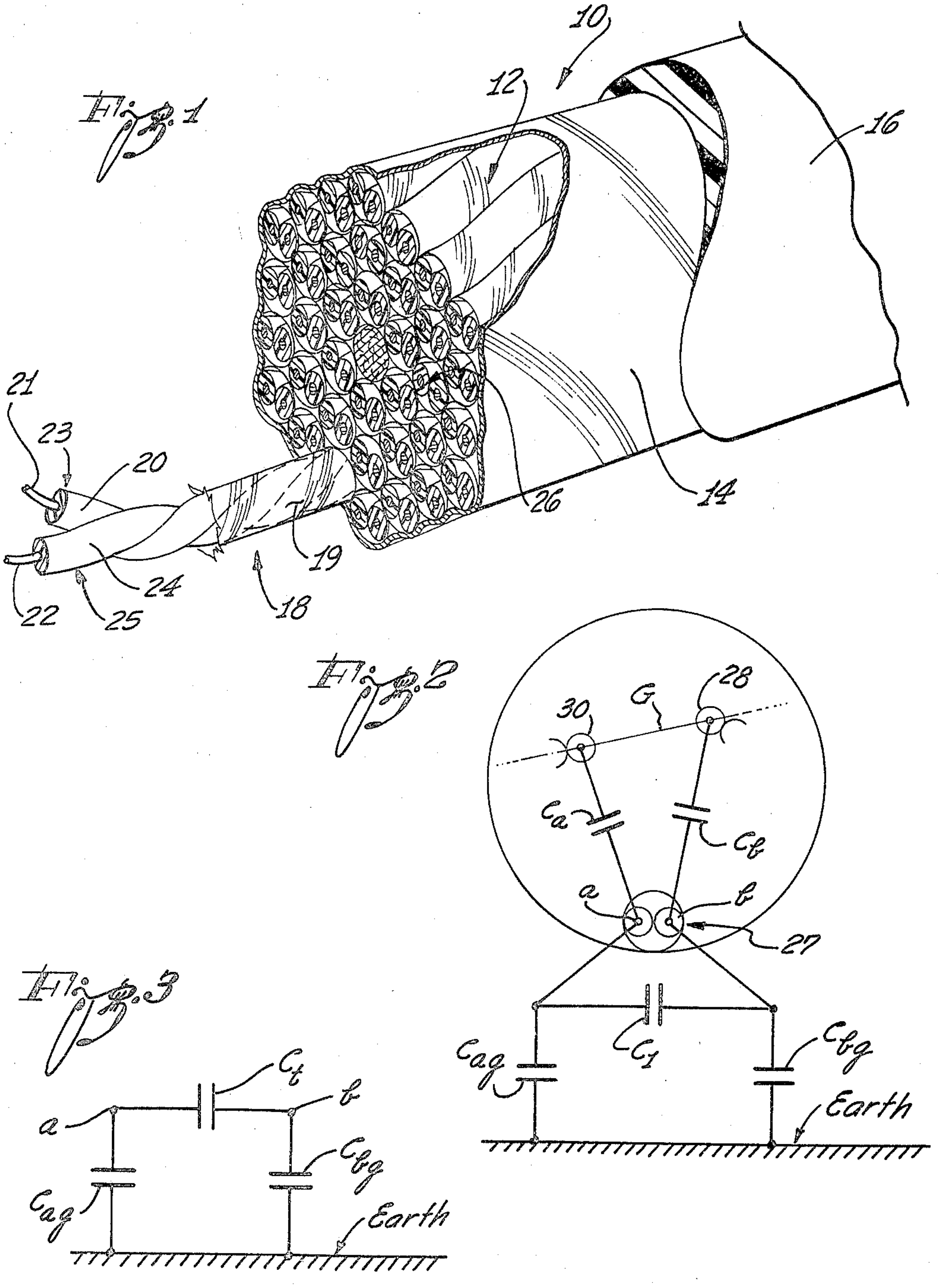
FIGURE 1 is an isometric view of a digital data transmission cable constructed in accordance with teachings of the present invention.
FIGURE 2 is a schematic drawing of the capacitance circuits within a data transmission cable in which the surge impedance has not been equalized nor has the cable been isolated from ground effects.
FIGURE 3 is a simplified circuit diagram of the cable schematically illustrated in FIGURE 2.

With reference to the drawings, there is shown in FIGURE 1 an isometric view of a digital data transmission cable 10 of the present invention including three concentric layers of pairs (such as a pair 18 and a pair 26) cabled around a core of filler material into a cable bundle 12. The cable bundle 12 is covered with a thin layer of conductive material 14. Over the thin layer of conductive material 14 is extruded a layer of insulating material 16.

To understand the structure of the present invention, reference is made to FIGURE 2, wherein is shown a schematic drawing of the capacitance circuits within a data transmission cable in which the surge impedance has not been equalized nor has the cable been isolated from ground effects. More particularly, a cable is depicted as being near an earth plane. Within the cable is shown a pair 27 including the conductors *a* and *b*. Additionally, all other conductors within the cable form a ground plane and are symbolically depicted as a ground plane G passing through a conductor 28 and a conductor 30. The capacitances which control the surge impedance of the pair 27 are the capacitance $C_a$ measurable between the conductor *a* and the ground plane G, the capacitance $C_1$ measurable between the conductor *a* and the conductor *b*, and the capacitance $C_b$ measurable between the conductor *b* and the ground plane G. The capacitances $C_a$ and $C_b$ represent the net capacitance from conductor *a* and conductor *b*, respectively, to all other conductors in the cable bundle. The closeness of the cable to the earth plane causes capacitances $C_{ag}$ and $C_{bg}$, measurable between the outer conductors *a* and *b*, respectively, to become significantly large.

With reference to FIGURE 3, it has been found that the total capacitance $C_t$ between the conductors *a* and *b* is determined by the following equation:

$$C_t=\frac{C_aC_b}{C_a+C_b}+C_1 \qquad \text{(Eq. 1)}$$

It has been found from experimentation with unbalanced data transmission cables that the equivalent capacitance formed between conductors *a* and *b* by the series connection of the capacitances $C_{ag}$ and $C_{bg}$ may be quite large compared to the preferred controlling capacitance $C_t$. Analysis of the circuit in FIGURE 3 illustrates the disturbing effect of the earth plane upon the surge impedance of the pair 27, including the conductors *a* and *b*, as the capacitances $C_{ag}$ and $C_{bg}$ are increased.

When a cable such as shown in FIGURE 2 is constructed to have all conductors therein of the same size, and each conductor to have the same thickness of insulating material thereon, the surge impedance of the pairs in the cable varies considerably depending upon the position of the pair in the cable and the twist length of the pair. It has been found that where all pairs within the cable are constructed to have the same twist length and the same thickness of insulating material on the conductors thereof, the surge impedance of pairs in the outer layer is appreciably higher than the surge impedance of those pairs forming an inner layer of the cable. It may be seen, with refernce to Equation 1 above, that if the capacitances $C_a$ and $C_b$ can be held to low predictable values, and if the increases in the capacitances $C_{ag}$ and $C_{bg}$ as the cable is placed in close proximity to conducting surface or the earth can be eliminated, the most significant factor in controlling the surge impedance of the pair 27 would be the capacitance $C_1$ measurable between the conductors *a* and *b* of the pair 27.

Accordingly, with reference to FIGURE 1, it has been found that when a thin layer 14 conducting material, such as an aluminum foil, is placed around and completely covers the cable bundle 12 in which pairs have the same size wires therein and the same twist length, the outer layer of pairs within the cable 10 will have a much lower surge impedance than do all those pairs comprising the inner layers. Without the thin layer of conducting material 14, the surge impedance of the outer layer is reduced only at any spot along the length of the cable which comes in contact or in close proximity to a conducting surface. However, this latter effect does not occur when the conducting material 14 is placed around the cable bundle 12. Thus, it is the teaching of the present invention to use a thin conducting surface 14 applied over the cable bundle of pairs for the sole purpose of establishing fixed electrostatic field boundary for conductor-to-ground capacitances. This thin conducting surface 14 would normally be connected to earth at the ends of the cable 10 to short-circuit the capacitance between the conducting surface 14 and the earth. It should be pointed out that this thin conducting surface 14 may be formed from one of many materials that are well known to those skilled in the art to have sufficient conductivity to insure a definite boundary for the capacitances involved. Such materials as copper, aluminum, or other metal of low resistivity and low magnetic permeability may be used, or the conducting surface 14 may be formed by a thin extruded layer of conductive plastic or fibers of such suitable material. The surface 14 is used solely for establishing an electrostatic field boundary, and any advantageous radiation shielding effects which may be realized are merely surplus to the desired effect. It has also been found that the effects of surge impedance variations due to the permeability of the conducting surface 14 are minimal.

Having thus covered the cable bundle 12 of pairs with a thin conducting surface 14 to prevent changes in the capacitance of wires within the cable bundle 12 to earth, a means is required for adjusting the surge impedance of the individual pairs so that the outer pairs will not have a lower surge impedance than those of the inner pairs. It has been found that the surge impedance of these inner pairs may be made equal to the surge impedance of the outer pairs in one of two convenient ways. With reference to FIGURE 1, there is shown a pair 18 including wires 23 and 25 twisted together. The wire 23 is formed by extruding an insulating material 20 over a conductor 21, and the wire 25 is formed by extruding an insulating material 24 over a conductor 22. The lay length (that is, the number of turns per unit length) of the pair 18, and of all similar pairs in the outer layer of the cable bundle 12, may be made longer than the lay length of pairs on inner layers, such as the pair 26 in the second layer of the cable bundle 12. Alternatively, the lay length of the inner pairs, such as the pair 26, may be increased over those of the outer pairs, such as the pair 18. In either event, the pairs in the outer layer of the cable bundle 12 will have a longer lay length than the pairs forming the inner layers of the cable bundle 12 have. Shortening of the lay length of the inner pairs increases the capacitance per unit length of the inner pairs and, thus, lowers the surge impedance of the inner pairs to a value equal to the surge impedance of the outer pairs.

Having thus obtained a method for equalizing the surge impedances of inner and outer pairs, the exact value of the surge impedance can be adjusted by the suitable choice of insulation thicknesses on the individual conductors and the proper choice of insulating materials having a desired dielectric constant. It should be kept in mind, however, that in the cable of the present invention each conductor has the same thickness of the chosen dielectric material surrounding it. The provision that all conductors are of the same size and have the same thickness of insulating material covering them means that all wires may be formed at one time in one continuous operation, such as extrusion. The ability to manufacture all wires in one operation, which will later be used to form the cable 10, substantially reduces the cost of the cable 10 and simplifies its construction.

It has also been found necessary, in some instances, to insure that the lay length of the pairs is held constant and free from any change which might occur during the manufacture and handling of the cable bundle 12 as it is formed. This effect may be accomplished by a number of means such as by wrapping the pairs with a thin insulating material such as "Mylar" (a trademark of the E. I. du Pont Company) film or by extruding a thin layer of nylon over the twisted pairs. As shown in FIGURE 1, a thin insulating layer 19 has been placed over the twisted wires 23 and 25 to form the pair 18 and to constrain the two wires thereof. If the wires 23 and 25 were to unwrap, shift their relative positions with respect to each other, or move apart, such movement would upset their planned spacing and, thus, their mutual capacitances and self-inductance which, in turn, control their surge impedance. Alternatively, the insulations 20 and 24 of the wires 23 and 25, respectively, may be bonded together so as to immobilize the insulated conductors with respect to each other in a paired configuration.

As is well known in the cable art, cross-talk between pairs in adjacent layers within the cable bundle 12 may be substantially minimized by cabling adjacent layers in opposite directions. That is, the first layer of pairs would be cabled about the filler core with a left hand lay, for example, while the second layer of pairs would be cabled about the first layer so as to have a right hand lay, and so on. Other considerations, such as mechanical flexibility and economy of materials, may bear upon the decision of exactly what cable lay length should be chosen for the various layers of the cable bundle 12.

Thus, the present invention tends to substantially eliminate all deleterious effects brought about when the cable 10 is placed in close proximity with a conducting surface and provides a cable including many pairs having substantially equal surge impedances. Moreover, the completed data transmission cable of the invention is substantially smaller in overall diameter than comparable cables of the prior art and is extremely flexible. It is, therefore, clear that remarkable improvements in the transmission of digital data between high speed, low power circuitry are realized by the use of the present invention. It is to be understood that the above arrangements are only illustrative of the application of the principles of the present invention. Numerous other arrangements may be devised by those skilled in the art without departing from the spirit and scope of the invention. Thus, by way of example, and not of limitation, it would seem possible to employ the capacitance balancing principles of the invention in cables comprising twisted trios and quads. It is apparent also that various types of insulating materials may be used to insulate the conductors of the individual pairs. Moreover, the thin layer 19 of insulating material used to immobilize the wires of individual pairs may be formed from many materials well known to those skilled in the wire and cable art. Finally, the thin conducting surface 14 may be of any material which would form a fixed electrostatic boundary layer around the cable bundle 12. Accordingly, from the foregoing, it is evident that these and various other changes may be made without departing from the spirit and scope of the invention as defined in the appended claims.

What is claimed as new is:

1. A multiple-channel digital data transmission cable comprising:

a plurality of conductor cores arranged in definite layers, each layer being at a depth within the cable different from the depth of other layers, each of said cores including a plurality of insulated conductors forming at least one circuit, said plurality of insulated conductors being twisted about a common axis, the lay length of twisted insulated conductors forming cores of the inner layers being shorter than the lay length of twisted insulated conductors forming cores of the outer layers to render the surge impedance of cores in the inner layers substantially equal to the surge impedance of cores in the outer layers;

means for forming an electrostatic field boundary around and covering the outermost layer of cores; and a protective sheath enclosing said electrostatic field boundary means.

2. A multiple-channel digital data transmission cable as defined in claim 1 wherein said means for forming an electrostatic field boundary comprises a layer of conductive material having a low resistivity and a low magnetic permeability.

3. A multiple-channel digital data transmission cable as defined in claim 1 wherein said protective sheath comprises an extruded jacket of insulating material.

4. A multiple-channel digital data transmission cable as defined in claim 2 wherein said layer of conductive material comprises a thin, spirally wrapped layer of aluminum foil.

5. A multiple-channel digital data transmission cable as defined in claim 1 wherein all conductors are of equal size and have equal thicknesses of insulation therearound.

6. A multiple-channel digital data transmission cable as defined in claim 1 which further includes a holding means surrounding and covering each core to maintain the position of insulated conductors within the cores relative to each other, said holding means having a predetermined dielectric constant and thickness which tends to equalize the surge impedance of cores in different layers.

7. A multiple-channel digital data transmission cable as defined in claim 6 wherein said holding means comprises a spirally-wrapped layer of Mylar film.

8. A multiple-channel digital data transmission cable as defined in claim 6 wherein said holding means comprises a thin extruded layer of nylon.

9. The combination as defined in claim 1 wherein each of said cores comprises two insulated conductors twisted together about a common axis.

10. The combination as defined in claim 9 wherein each of said cores is surrounded and covered by a thin layer of insulating material for holding the position of said two conductors constant relative to each other, and wherein said means for forming an electrostatic field boundary comprises a thin layer of conductive material having a low resistivity and a low magnetic permeability.

References Cited

UNITED STATES PATENTS

| | | | |
|---|---|---|---|
| 2,119,853 | 6/1938 | Curtis | 174—34 X |
| 2,036,045 | 3/1936 | Harris | 174—34 X |
| 2,081,427 | 5/1937 | Firth et al. | 174—34 |
| 3,379,821 | 4/1968 | Garner | 174—36 |
| 3,297,814 | 1/1967 | McClean et al. | 174—36 X |
| 3,209,064 | 9/1965 | Cutler | 174—113 X |
| 2,792,442 | 5/1957 | Parce | 174—32 |

FOREIGN PATENTS

| | | |
|---|---|---|
| 1,059,343 | 2/1967 | Great Britain. |
| 950,570 | 10/1956 | Germany. |

LARAMIE E. ASKIN, Primary Examiner

A. T. GRIMLEY, Assistant Examiner

U.S. Cl. X.R.

174—34, 107, 113